United States Patent Office 3,467,482
Patented Sept. 16, 1969

3,467,482
PROCESS FOR IMPARTING IMPROVED DYE-LIGHTFASTNESS TO BASIC DYEABLE POLYESTER STRUCTURES
Sidney B. Maerov, Kinston, N.C., assignor to E. I. du Pont de Nemours and Company, Wilmington, Del., a corporation of Delaware
No Drawing. Filed Feb. 25, 1965, Ser. No. 435,321
Int. Cl. D06p *3/00, 5/00*
U.S. Cl. 8—4
1 Claim

ABSTRACT OF THE DISCLOSURE

In the dyeing of shaped polyester structures with basic dyes, the method of imparting improved dye-lightfastness which comprises mixing a solution of the basic dye with a solution of a 2-phenyl-benzotriazole compound having a carboxyl group attached to an aromatic ring carbon, isolating the resulting basic dye salt of the benzotriazole compound, dispersing the basic dye salt in an aqueous medium to form a dyebath, and dyeing the shaped structure in the dyebath.

---

This invention relates to the dyeing of shaped structures with basic dyes useful in the textile arts. More particularly, it relates to dyeing with novel photostabilized basic dyes to provide improved dye lightfastness in synthetic linear condensation polyester structures containing acid dye sites.

Synthetic polyesters modified by the inclusion in the polymer molecule of sulfonate salt groups have been described by Griffing et al. in U.S. Patent No. 3,018,272 dated Jan. 23, 1962. These modified polyesters, in the form of fibers and film, are particularly valuable because they present acidic dye sites and thereby impart affinity for basic dyes which are well known for their brilliance of hue. Polyester articles dyed with basic (cationic) dyes have become commercially important, but are widely recognized as being deficient in dye-lightfastness. Many efforts have been made to overcome this lightfastness problem, but no fully satisfactory solution has been found.

The present invention improves the lightfastness of synthetic polyester articles dyed with basic dyes by the provision of photostable basic dye compositions which may be applied to acid-modified polyester fibers and films.

The improved photostable basic dye compositions of this invention are salt-like molecules in which the cation is a basic dye molecule and the anion is a substantially colorless, ultraviolet light-absorbing molecule. The structure of such a dye composition may be indicated as follows:

[Basic dye cation]+[U.V. absorber anion]−

Basic dye compositions of this type may be prepared by mixing a solution of the basic dye with a solution of a stoichiometric amount of an inorganic salt, e.g., alkali metal salt, of a suitable ultraviolet light-absorbing compound. Upon mixing the two solutions, a basic dye salt of the light absorbing compound forms and is precipitated because of its relative insolubility. After isolation and purification, the novel dye-salt composition of this invention may be re-dispersed in water by the use of suitable wetting agents and applied to polyester structures by conventional dyeing processes. The hue and brilliance of the new dye composition is substantially equivalent to that of the corresponding unmodified basic dye.

Surprisingly, it has been found that polyester structures containing sulfonate salt groups, when dyed with the basic dye-ultraviolet light-absorbing anion compositions of this invention, exhibit a dye lightfastness considerably better than similar structures dyed with the unmodified basic dye and the same ultraviolet light-absorbing compound applied separately (instead of combining them before application). It is further found that the lightfastness of the structures of this invention is superior to that obtained when the ultraviolet light-absorbing material is incorporated in the molten polyester before shaping, and the unmodified basic dye is applied to the final structure by a conventional dyeing process.

The anion portion of the dye composition of this invention is a member of a recognized class of ultraviolet light-absorbing materials referred to in the art as "UV screeners." These are compounds which exhibit a strong absorption for electromagnetic radiation having a wavelength in the range 290–390 millimicrons, and which have little or no absorption in the range 400–800 millimicrons. Anionic character is imparted by the presence in the molecule of a weakly acidic group such as a carboxyl group (—COOH), which can be neutralized by a simple base such as NaOH to give —COO−Na+.

Members of a known class of ultraviolet light-absorbing compounds which are suitable for use in this invention are 2-phenyl-benzotriazoles having a carboxyl group attached to an aromatic ring carbon, the 1,3-nitrogens of the triazole ring being attached to adjacent carbons of the benzo group, and the phenyl radical having a hydroxyl or acylamido substituent in ortho position to the carbon attached to the 2-nitrogen of the triazole ring.

Suitable ultraviolet light-absorbing compounds may also be represented by the formula:

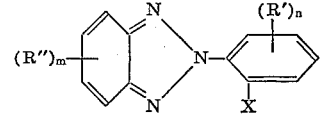

in which X may be —OH or

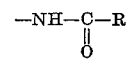

where R is a hydrocarbon radical containing less than 19 carbon atoms; R′ and R″ may be the same or different and are selected from the group consisting of hydrocarbon radicals containing less than 19 carbon atoms each, which radicals can be acyclic or which can form an extended aromatic structure of up to 14 carbons with the benzo or 2-aryl ring, alkoxy radicals containing less than 19 carbon atoms each, and electronegative groups such as the halogens, nitro groups, hydroxyl groups, and carboxyl groups; with the proviso that at least one of R′ and R″ is a carboxyl salt group. In the formula, m and n can be the same or different and are each cardinal numbers of less than 5, i.e., 0, 1, 2, 3, or 4. Compounds of this type are described in U.S. Patent No. 3,004,896 dated Oct. 17, 1961, and in British Patent No. 922,943 published July 23, 1963.

Examples of hydrocarbon radicals containing less than 19 carbon atoms each include alkyl, alkylene and alkoxy radicals such as ethyl, propyl, hexyl, octyl, decyl, octadecyl, ethoxy, propoxy, butoxy, tetradecyloxy, and the like.

The term "acyl" is used herein in a generic sense to refer to organic radicals formed by removal of the OH group from the acidic moiety of organic acids, including carboxylic, sulfonic and phosphonic acids. The term includes such radicals as alkylcarbonyl, arylcarbonyl, cycloalkylcarbonyl, alkylsulfonyl, arylsulfonyl, and cycloalkylsulfonyl, alkylphosphonyl, arylphosphonyl, and cycloalkylphosphonyl. Specific examples of such radicals are formyl, acetyl, propionyl, benzoyl, 2,4,6-trimethylbenzoyl, tetramethyladipoyl, terephthaloyl, tetramethyl terephthaloyl, pivaloyl, methanesulfonyl, ethanesulfonyl, decanesulfonyl, hexahydrophenylphosphonyl, trifluoroacetyl, trichloroacetyl and the like.

Other suitable ultraviolet light-absorbing compounds may be represented by the formula $$RR'C=C(COO^-Na^+)CN$$

which is descriebd in Belgian Patent No. 601,113 dated Mar. 9, 1961.

Basic dyes suitable for use in preparing the dye compositions of this invention are members of the standard basic dye classes defined in the Colour Index, such as the oxazine dyes, the triphenylmethane dyes, the methine dyes, polymethine dyes and cyanine dyes.

Typical ultraviolet light-absorbing salts of basic dyes comprehended by the definition of the present invention include those represented by the structures shown in Table I.

TABLE I

1. Yellow

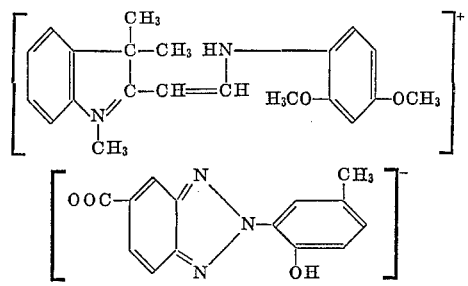

2. Blue

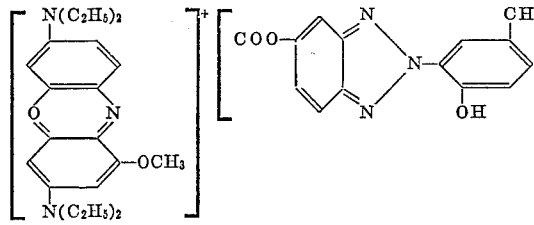

3. Green

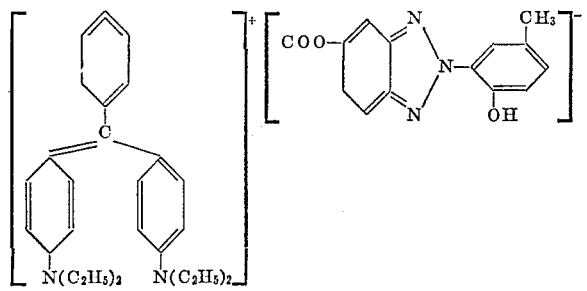

4. Orange

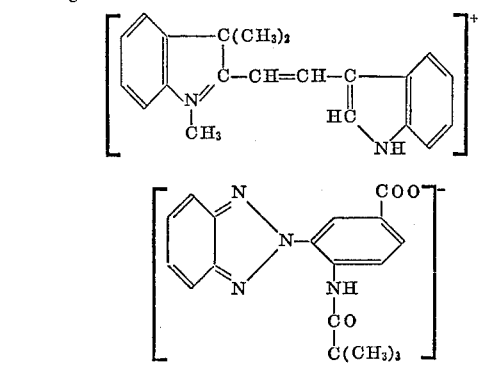

5. Red

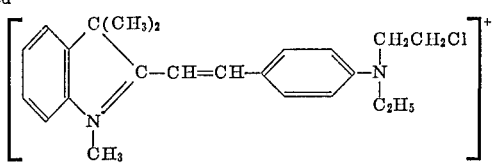

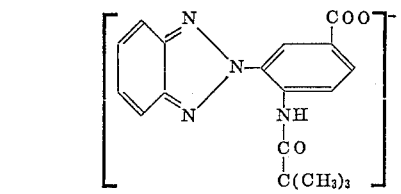

6. Red

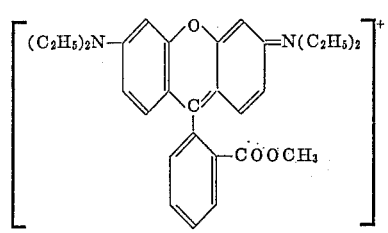

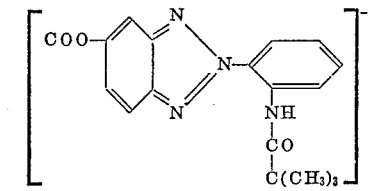

7. Red

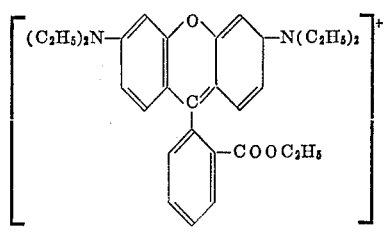

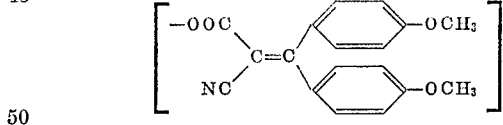

The basic dye compositions of this invention, described above, are particularly valuable for dyeing the sulfonate-modified polyesters described in U.S. Patent No. 3,018,272, dated Jan. 23, 1962. The outstanding commercial example of such polyesters is polyethylene terephthalate containing a minor amount, for example about 0.5 to 5 mol percent of sodiumsulfoisophthalate units in the molecule which is sold in the form of textile fibers for apparel and other related uses. The basic dye compositions of this invention may be applied to these fibers in the conventional fashion, i.e., by contacting the textile with an aqueous dispersion of the dye at an elevated temperature in the presence of dispersing agents and known dyeing assistants such as chlorobenzene or a mixture of benzanilide and dimethyl terephthalate. Dyeing may be carried out under pressure without a dyeing assistant if desired.

The invention is further illustrated in the following examples, which are not intended to be limitative. In the examples, lightfastness ratings are given in terms of the Gray Scale Rating as described in Standard Methods for the Assessment of the Color Fastness of Textiles by the Society of Dyers and Colorists, 19 Piccadilly, Bradford, Yorks, England. Ratings are given on a 1 to 5 scale where 5 denotes no shade change and 1 denotes the greatest shade change. A unit increase in the Gray Scale rating denotes a twofold improvement in lightfastness.

Example I

A 0.106 gram portion (3.93×10⁻⁴ mols) of the UV screener 2(2'-hydroxy-5'-methylphenyl)-5-carboxybenzotriazole, in finely-powdered form, is dissolved in 100 ml. of hot dioxane water (50/50, vol./vol.) and $$Na_2CO_3 \cdot H_2O$$

(0.0248 gm.; 2×10⁻⁴ mols) is added. The resulting pale yellow solution is filtered into a 500 ml. volumetric flask and made up to volume with water, giving a concentration of 7.87×10⁻⁴ mols per liter. The solution is coded Solution A.

A solution of C.I. Basic Orange 21 (0.122 gm.; 3.46×10⁻⁴ mols) dissolved in 50 ml. of hot 2B alcohol water is added to 440 ml. (3.46×10⁻² mols screener) of Solution A. After a few minutes stirring, a reddish solid begins to precipitate. The mixture is allowed to stand about 72 hours and then 0.15 gm. of orange solid is reclaimed by filtration. This solid is found to be insoluble in cold water, but readily soluble in alcohol and benzene. The solid is purified by reprecipitation from hot benzene solution by the addition of cyclohexane.

*Analysis.*—Calculated for $C_{36}H_{33}N_5O_3 \cdot 2H_2O$: percent C, 69.8; percent H, 6.02; percent N, 11.3. Found: percent C, 69.90; percent H, 5.50; percent N, 12.0. The product has the structure:

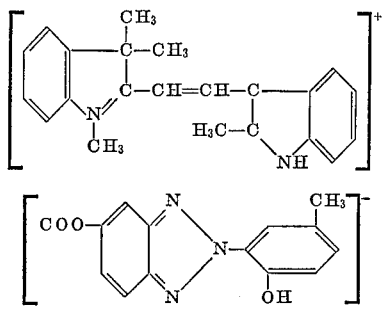

A dye bath is prepared by dispersing the powdered dye prepared above in water using a small amount of a nonionic dispersing agent, oleyl alcohol-ethyleneoxide condensate (Alkanol HCS, Du Pont). The amount is adjusted to give about 2.0 grams per liter dye in water. A film prepared from a copolymer of polyethylene terephthalate containing 2 mol percent 5-sodiumsulfoisophthalic acid is immersed in the dye bath and dyed under pressure at 120° C. for 2 hours. The film to bath ratio was 40 to 1. The dyed film has a bright orange color.

A second film sample is dyed with the orange dye, Basic Orange 21, with no ultraviolet-absorbing agent added. This sample serves as control.

The test and control film samples are tested for dye lightfastness by exposure to the light of a 1500 Watt Xenon arc in air in the "Xenotest" apparatus (Quartzlampen Gesellschaft M.B.H. Hanau) for 5 and 10 hour periods (light-dark sequence). The results are shown in the following table. The improved lightfastness of the dye composition of this invention is clearly evident.

TABLE 2

| Sample | Lightfastness Rating | |
|---|---|---|
|  | 5 hrs. | 10 hrs. |
| Test | 5–4 | 4–3 |
| Control | 4–3 | 3 |

Example II

The general procedure of Example I is repeated with the exception that the orange basic dye is replaced by two other basic dyes, a blue oxazine dye (Basic Blue 4; CI 51004) and a green triphenylmethane dye (Basic Green 1; CI 42040). Both dyes are precipitated with a freshly-made solution of the same UV screener described in Example I, redispersed, and applied in a 118–122° C. dye bath to samples of the same polyester film used in Example I. Control film samples are prepared at the same time using the same dyes, but without the UV screener anions present. The concentration of the precipitated complexes is adjusted stoichiometrically to give the same theoretical amount of dye cation in the dye bath as found in the control (pure dye) bath. Although the test samples dyed with the precipitated complexes are slightly weaker in shade than the control samples, they are found to be significantly better in uniformity and in freedom from blotches. The bulky organic screener anion appears to exert a retarding and leveling effect during dyeing, which is considered highly desirable.

The dyed film samples are tested for lightfastness in the "Xenotest" apparatus using the light-dark exposure sequence. The results, shown in Table 3, clearly indicate the improved lightfastness of the dye compositions of the present invention.

TABLE 3

| Dye | Percent Dye | Lightfastness Rating | |
|---|---|---|---|
|  |  | 5 hrs. | 10 hrs. |
| Blue CI 51004 plus UV Screener | 0.66 | 5–4 | 5–4 |
| Blue Control | 0.40 | 4 | 3 |
| Green CI 42040 plus UV Screener | 0.47 | 5–4 | 3–2 |
| Green Control | 0.30 | 4 | 3–2 |

Example III

Following the general procedure of Example I, an aqueous solution of the sodium salt of a UV screener having the following formula is prepared.

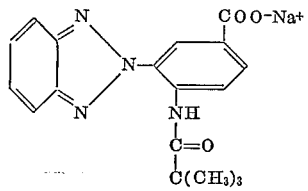

This solution is mixed with a solution of a red basic dye to give a precipitate having the following structure:

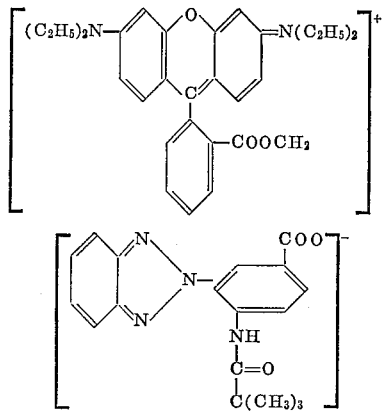

This red dye composition is applied to the copolyester film of Example I and tested for dye lightfastness in the Xenotest apparatus with the results shown in the following table.

For comparison, a control film sample is dyed with the unmodified red dye and tested for lightfastness in the same manner. The superior performance of the test sample prepared in accordance with this invention is evident from the data in the table.

TABLE 4

| Sample | Percent Dye | Lightfastness Rating | |
|---|---|---|---|
|  |  | 10 hrs. | 20 hrs. |
| Test | 0.53 | 5–4 | 4–3 |
| Control | 0.33 | 3 | 3 |

Example IV

Solution A of Example I is used to prepare dyesalt compositions of the following basic dyes:
The methine dyes, C.I. Basic Yellow 13 and C.I. Basic Orange 21; the xanthene dye, C.I. Basic Red 19; and the oxazine dye, C.I. Basic Blue 4.

Each of these dye-salt compositions is used to dye fabric samples woven from a commercially available fiber composed of the copolyester of polyethylene terephthalate containing 2 mol percent 5 sodiumsulfoisophthalate units. Dyeings are carried out in aqueous medium at the boil, using as a carrier equal parts of dimethyl terephthalate and benzanilide. Control samples are prepared in a similar fashion using the unmodified dyes. Dye bath strengths are adjusted to obtain dyeings of equal strength on test and control samples. After dyeing, the samples are heat set at 205° C. for two minutes in accordance with normal commercial practice. The samples are then tested for lightfastness using both the Xenon Tester and a conventional Fadeometer. The results are shown in the following table. The superior performance of the dye composition of the present invention is evident from an inspection of the data in the table.

TABLE 5.—FADEMOETER PERFORMANCE

| Sample | Lightfastness Ratings of Dye Samples | | |
|---|---|---|---|
| | 10 hrs. | 20 hrs. | 40 hrs. |
| [Basic Yellow 13]+ [UV Screener]− | | 5 | 5-4 |
| Yellow Control | | 4 | 2 |
| [Basic Orange 21]+ [UV Screener]− | 5-4 | 4 | 4-3 |
| Orange Control | 4 | 3 | 3-2 |
| [Basic Red 19]+ [UV Screener]− | 5-4 | 3-2 | 2 |
| Red Control | 2 | 1 | 1 |
| [Basic Blue 4]+ [UV Screener]− | 4 | 3 | 2 |
| Blue Control | 3 | 2 | 1 |
| [Basic Yellow 13]+ [UV Screener]− | | 5-4 | 5-4 |
| Yellow Control | | 5-4 | 4-3 |
| [Basic Orange 21]+ [UV Screener]− | 5-4 | 4 | 3 |
| Orange Control | 5-4 | 4 | 2 |
| [Basic Red 19]+ [UV Screener]− | 4 | 3 | 2-1 |
| Red Control | 2 | 1 | 1 |
| [Basic Blue 4]+ [UV Screener]− | 5-4 | 4 | |
| Blue Control | 4 | 3 | |

Example V

This example illustrates the preparation of a yellow dye-screener complex.

A solution of 2.547 gm. (7.72×10$^{-3}$ mols) of the methine dye C.I. Basic Yellow 13 is prepared by dissolving the dye in the minimum volume of 2B alcohol and making up to 100 ml. with water in a volumetric flask.

A solution of 2.077 gm. (7.72×10$^{-3}$ mols) of the UV screener described in Example I is prepared by heating the material with 50 ml. of dioxane to which was previously added 0.648 gm. of sodium bicarbonate dissolved in 50 ml. of water. When the solution clears, it is made up to 250 ml. by adding dioxane-water (50/50 vol./vol.).

The above two solutions are mixed with stirring until cloudy, then the yellow dye-salt complex is allowed to separate while the mixture stands for a period of about 65 hours. After filtration, the solid is washed with water and air dried.

*Analysis.*—Calculated for $C_{34}H_{33}N_5O_4$: percent C, 70.94; percent H, 5.78. Found: percent C, 70.1, 71.1; percent H, 5.72, 5.76. The product has the structure:

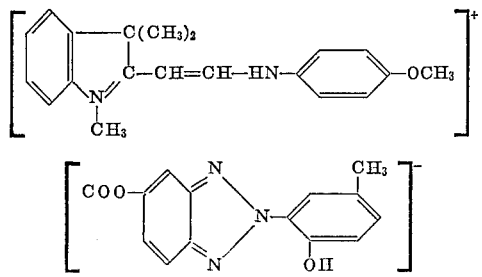

Example VI

For comparison purposes the following experiment is carried out to determine the effect on dye lightfastness of UV screening agents incorporated in the polyester before spinning into yarn. The two UV screeners tested have the following structures:

VIa 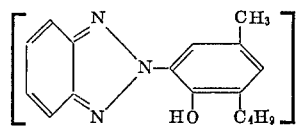

VIb 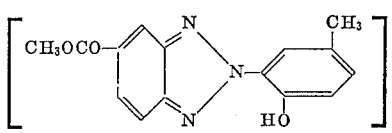

These two screeners are chosen because their structures correspond closely with that used to prepare Solution A of Example I, but are modified sufficiently to prevent reaction with molten polyester.

A copolymer of polyethylene terephthalate containing 2 mol percent sodium 3,5-dicarboxybenzene sulfonate units is heated to 275° C., and to the molten copolymer is added a sufficient quantity of the UV screening agent to give a concentration of 1% by weight. The molten polymer is stirred for 15 minutes, rapidly quenched in Dry Ice, finely ground, and melt-pressed into film samples having a thickness of 1.0 mm. A control polyester film sample containing no UV screening agent is also prepared.

Properties of two test samples and control are shown in Table 6, wherein the term "relative viscosity" refers to the ratio of the viscosity of a 10% solution of the polymer in a mixture of 10 parts of phenol and 7 parts of 2,4,6,-trichlorophenol (by weight) to the viscosity of the phenol-trichloro-phenol mixture, per se, measured in the same units at 25° C. The designation "COOH" refers to free carboxyl groups in the polymer, both ionized and non-ionized. The concentration of carboxy groups may be determined by the procedure of Pohl in Analytical Chemistry, vol. 26, page 1614, October 1954, and is expressed in equivalents per million grams. The term "ether" refers to aliphatic ether groups, e.g., diethylene glycol and the like, in the polymer chain. The concentration of ether groups may be readily determined by known chemical methods, by means of infrared absorption spectra, and by melting point determination.

TABLE 6

| Properties | UV Screener | | |
|---|---|---|---|
| | VIa | VIb | Control |
| Relative Viscosity | 18.8 | 17.6 | 19.8 |
| COOH (eq./10$^6$ gm.) | 30.6 | 31.1 | 30.7 |
| Ethers (mol percent) | 2.1 | 1.6 | 2.2 |
| Film Color | (¹) | (²) | (²) |

¹ Off-white.
² Excellent.

The presence of the UV screeners in the pressed film samples is confirmed by absorption spectrophotometry.

The film samples are dyed under pressure at a temperature of 118-122° C. using the xanthene dye C.I. Basic Red 19. The dye concentration on the film is 0.5%. When tested in the Xenon tester for an exposure period of 5 hours, no difference in lightfastness is observed indicating that the UV screener has not improved the dye performance. All three samples have a lightfastness rating on the Gray Scale of 2. This is in contrast to the results shown in Table 5 of Example IV where the red sample dyed with the dye-screener complex of this invention has a lightfastness rating of 4 after 10 hours exposure compared with a rating of 2 for its control.

Although the invention has been exemplified with certain specific basic dyes, it will be recognized by those skilled in the art that any other basic dye may be substituted in the examples for the preparation of the basic dye/UV absorber compositions of the present invention.

The dye-salt compositions of this invention find their greatest utility in the dyeing of synthetic polyester structures, e.g., fibers and film, modified by the inclusion of acidic dye sites in the polymer molecule such as those disclosed in U.S. Patents Nos. 3,052,653, 3,057,826, 3,057,827 and 3,018,272. The utility of these compositions is not limited to polyester structures, however, and may be applied to any other structure normally dyed with basic dyes such as the natural fibers, cotton, silk, and wool.

Since many different embodiments of the invention may be made without departing from the spirit and scope thereof, it is to be understood that the invention is not limited by the specific illustrations except to the extent defined in the following claim.

I claim:
1. In the dyeing of shaped structures of the copolyester of polyethylene terephthalate and about 0.5 to 5 mol percent of 5-sodiumsulfoisophthalate with basic dyes, the method of imparting improved dye-lightfastness to the final dyed structure which comprises mixing a solution of the basic dye with a solution of a 2-phenyl-benzotriazole compound having the 1,3-nitrogens of the triazole ring attached to adjacent carbons of the benzo group, said compound being selected from the group consisting of 2(2'-hydroxy-5'-methylphenyl)-5-carboxybenzotriazole and 2(2'-trimethylacetylamido-5'-carboxyphenyl)benzotriazole, isolating the resulting basic dye salt complex of the benzotriazole compound, dispersing the basic dye salt in an aqueous medium to form a dyebath, and dyeing the shaped structure in the dyebath.

References Cited

UNITED STATES PATENTS

| | | | |
|---|---|---|---|
| 2,922,690 | 1/1960 | Mueller et al. | 8—26 X |
| 3,004,896 | 10/1961 | Heller et al. | 167—90 |
| 3,049,443 | 8/1962 | Coleman | 8—74 X |

FOREIGN PATENTS 922,943    4/1963    Great Britain.

OTHER REFERENCES

A. F. Strobel; American Dyestuff Reporter, Aug. 7, 1961, pp. 21–26.

Dyes and Chemicals Technical Bulletin, vol. 18, No. 1, May 1962, p. 37.

American Dyestuff Reporter, Abstracts, Aug. 5, 1963, p. 25.

GEORGE F. LESMES, Primary Examiner

T. J. HERBERT, JR., Assistant Examiner

U.S. Cl. X.R.

8—55, 74